United States Patent [19]

Hirose

[11] Patent Number: 5,479,831
[45] Date of Patent: Jan. 2, 1996

[54] FISHLINE TENSION MEASURING DEVICE FOR FISHING REEL

[75] Inventor: Haruomi Hirose, Tokyo, Japan

[73] Assignee: Daiwa Seiko, Inc., Tokyo, Japan

[21] Appl. No.: 218,807

[22] Filed: Mar. 28, 1994

[30] Foreign Application Priority Data

Mar. 29, 1993 [JP] Japan .................. 5-070173

[51] Int. Cl.⁶ ................................. G01L 5/00
[52] U.S. Cl. .................. 73/862.44; 73/862.474; 43/17
[58] Field of Search .......... 73/862.44, 862.474; 43/17

[56] References Cited

U.S. PATENT DOCUMENTS

| Re. 31,312 | 7/1983 | Eddens | 73/862.474 |
|---|---|---|---|
| 2,079,021 | 5/1937 | Malcolm et al. | 73/862.44 |
| 2,210,759 | 8/1940 | Hansen | 73/862.44 |
| 3,248,937 | 5/1966 | Vincent | 73/862.44 |
| 3,352,152 | 11/1967 | Abraham | 73/862.44 |
| 4,326,424 | 4/1982 | Koenig | 73/862.474 |
| 4,958,525 | 9/1990 | Hauer et al. | 73/862.474 |

FOREIGN PATENT DOCUMENTS 64-05493  2/1989  Japan .

*Primary Examiner*—Richard Chilcot
*Assistant Examiner*—R. Biegel
*Attorney, Agent, or Firm*—Longacre & White

[57] ABSTRACT

A fishline tension measuring device for use in a fishing reel which is simple in structure, easy to assemble, and provides a high strength against shock. Strain gauges are mounted on bodies assembled into the spool drive gear train, to detect strain caused by tension on the fishline. In the fishline tension measuring device, at least one of the bearings for supporting the two ends of a spool shaft is supported by a bearing support member, which may be formed integrally with a reel main body and can be strained according to loading forces applied to the spool shaft when tension is given to a fishline, and one or more strain gauges for measuring the tension given to the fishline are mounted on the bearing support member.

7 Claims, 9 Drawing Sheets

FISHLINE TENSION MEASURING DEVICE FOR FISHING REEL

BACKGROUND OF THE INVENTION

1. Field of the Invention

The present invention relates to a fishline tension measuring device for use in a fishing reel.

2. Description of the Prior Art

The present inventor has previously disclosed, by Japanese Utility Model Kokoku Publication No. Sho. 64-5493, a fishline tension measuring device for use in a fishing reel, which is capable of measuring the tension of a fishline when fish is caught on a bait on the fishline.

FIGS. 13 to 16 show the prior art fishline tension measuring device. In these figures, reference numeral 1 designates a spool shaft rotatably supported by two side plates 5 and 7 through bearings (one bearing 3 is shown in the drawings). A spool 11 with a fishline 9 wound therearound is mounted on the spool shaft 1 so that the spool is relatively swingable and rotatable relative to the spool shaft 1. A gear train for driving the spool 1 is accommodated within and supported by the side plate 7, through which the rotational operation of the handle 13 causes the spool 1 to be rotationally driven.

The bearing 3, which supports one end of the spool shaft 1 on the side plate 5, is fitted in a ring-shaped support member 15 coaxially and integrally therewith. The support member 15 is fitted through an elastic space member 17 such as a Teflon sheet into a seat part 19 which is formed at a central and internal portion of the side plate 5. The elastic space member 17 permits the support member 15 with the bearing 3 to slightly move in the diametrical direction (i.e. the tensile direction on the fishline 9) depending on the load given to the spool shaft 1 when fish is caught on the fishline 9 and tension is applied to the fishline 9.

The support member 15 includes on the outer peripheral wall thereof a projecting portion 21 projecting from the support member 15 in a directions opposite to the tensile direction of the fishline 9 (the tensile direction being indicated by an arrow A in FIG. 15). One end of a strip-shaped strain plate 23 is screwed to the projecting portion 21. The strip-shaped strain plates 2 is formed of an SUS material or the like and has a thickness of 0.3 mm. A block 24 is fixedly secured to the other end of the strain plate 23. A tensioning screw 27 is threadingly engaged with the block 25. The tensioning screw 27 penetrates the side plate 5 in the diametrical direction thereof and supported thereby. Therefore, by screwing the screw 27 into the block 25, a given tensile force can be applied to the strain plate 23.

On the front and back surfaces of the strain plate 23, there are bonded two pairs of strain gauges 29, 31, 33 and 35, respectively. These strain gauges 29, 31, 33 and 35 are respectively used to detect the tensile force applied onto the fishline 9. In other words, when a load is applied to the spool shaft 1 due to the tensile force of the fishline 9 and thus the strain plate 23 is strained according to the load, the resistance values of the strain gauges 29, 31, 33 and 35 are changed according to the quantity of strain of the strain plate 23 to thereby detect the tensile force applied to the fishline 9.

The above-mentioned strain gauges 29, 31, 33 and 35 are connected to one another in such a bridge manner as shown in FIG. 16. In this bridge connection, one pair of mutually opposing connecting points $P_1$ and $P_2$ are respectively connected to a DC source, while the other pair of mutually opposing connecting points $P_3$ and $P_4$ are respectively connected to the inputs of a voltage amplifier 37. The output of the voltage amplifier 37 is connected to a tension display part 39.

As the conventional fishline tension measuring device is structured in the above-mentioned manner, if a fish is caught in a bait on the fishline to apply tension to the fishline 9, the tension is applied through the spool 11 and spool shaft 1 to the bearing 3 and at the same time the tension pulls the support member 15 including the bearing 3 in the direction of an arrow A shown in FIG. 15. Consequently, the support member 15, while compressing the space member 17, is slightly moved in the same direction according to the tension, which causes the strain plate 23 to extend elastically and produce strain in the strain plate 23.

Thus, when strain is produced in the strain plate 23 in this manner, the resistance values of the strain gauges 29, 31, 33 and 35 respectively bonded to the strain plate 23 are caused to vary, with the result that the balanced condition on the bridge is destroyed to thereby generate a potential difference between the connecting points $P_3$ and $P_4$. The potential difference is proportional to the tension to be applied to the fishline 9.

After amplified by the voltage amplifier 37, the potential difference is output to the tension display part 39, where the tension is displayed.

Therefore, if an angler views the display state of the tension display part 39, then the angler is able to judge easily the condition of the current tension.

In the above-mentioned conventional tension measuring device, however, there are still found problems to be solved: that is, since the strain plate 23 is screwed between the side plate 5 and support member 15, the structure thereof is complicated, which makes it difficult to assemble the device into a fishing reel and also increases the manufacturing cost of the device.

Further, if an operator accidentally drops down the reel or hits the reel against the rock and thus applies an external force to the reel, the thin strain plate 23 may be curved by the shock or the screwed portion of the strain plate 23 may be damaged. The original tension set for the strain plate 23 may thus be undesirably varied. For these reasons, the conventional tension measuring device is insufficient in anti-shock property.

SUMMARY OF THE INVENTION

The present invention eliminates the drawbacks found in the above-mentioned conventional tension measuring device. Accordingly, it is an object of the invention to provide a fishline tension measuring device for use in a fishing reel which is simple in structure, easy to assemble, and provides a higher strength against drop shocks and collisions.

In order to attain the above-noted and other objects, the present invention provides a fishline tension measuring device for use in a fishing reel, including a one piece bearing support for supporting a bearing with respect to a reel main body, the bearing in turn rotatably supports a spool shaft, wherein a strain gauge is mounted on an integral portion of the one-piece bearing support so as to detect an amount of strain caused on the bearing support due to the tension applied to the fishline.

The present invention further provides a fishline tension measuring device including a bearing support member having a first portion and second portion located radially inward relative to the first portion with respect to a spool shaft, the first portion being fixed to a reel main body and the second portion supporting a bearing which in turn supports the spool shaft, wherein a strain gauge is mounted on a portion of the bearing support member located radially between the first portion and the second portion.

Furthermore, the present invention provides a fishline tension measuring device for use in a fishing reel wherein a strain gauge for measuring the tension applied to a fishline is mounted onto a pin shaft for supporting an engaging claw which is engageable with a ratchet for preventing the reversed rotation of a spool.

These and other advantages will become apparent with reference the following drawings which illustrate by way of example the structural features of the invention.

DESCRIPTION OF THE PREFERRED EMBODIMENTS

With reference to the accompanying drawings, description will now be given of the embodiments of a fishline tension measuring device according to the invention.

Figure 1:
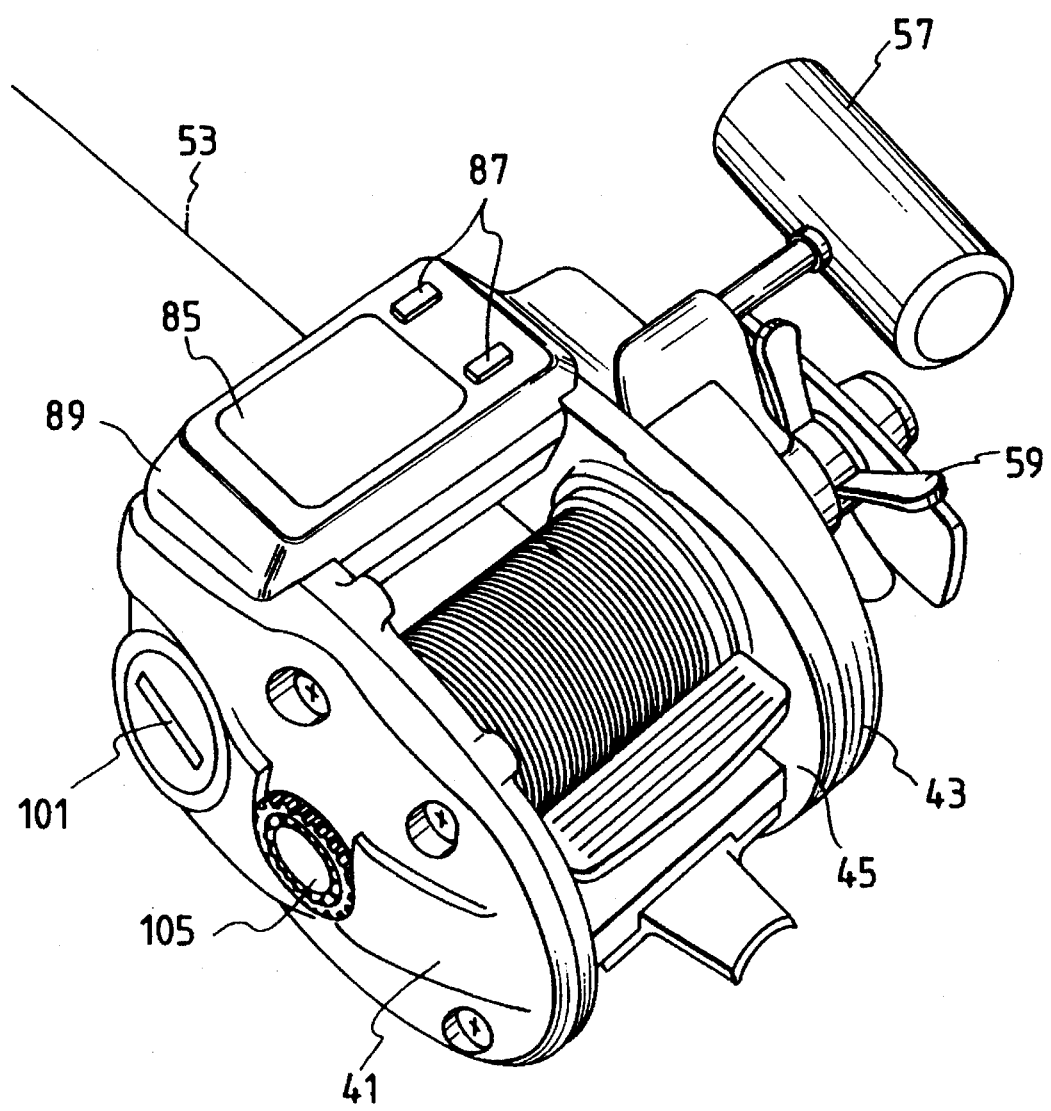
FIG. 1 is a perspective view showing an entire construction of a fishing reel including a fishline tension measuring device according to a first embodiment of the invention.
Figure 2:
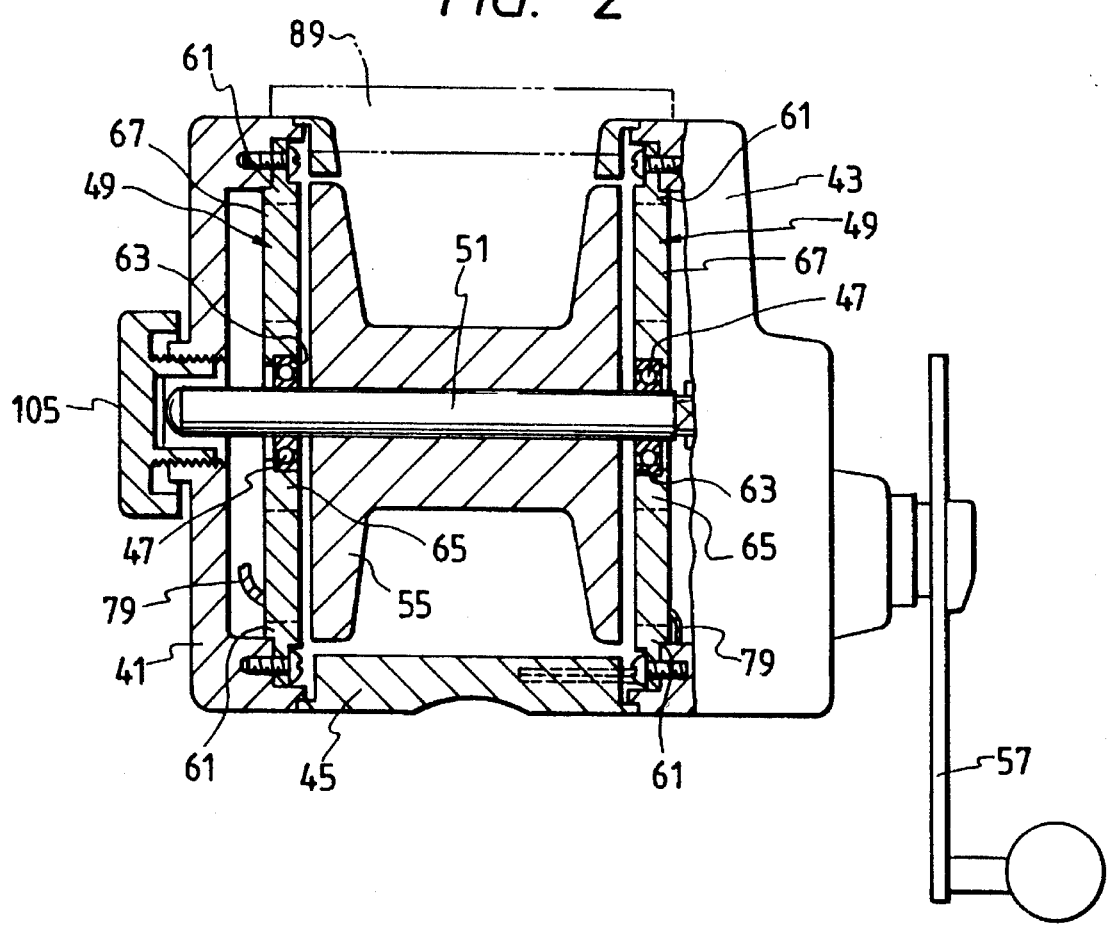
FIG. 2 is a partially cut-away front view of a fishing reel shown in FIG. 1.

FIG. 1 is a perspective view of the entire construction of a fishing reel including a fishline tension measuring device according to a first embodiment of the invention, and FIG. 2 is a partially cut-away front view of the above first embodiment. In these figures, reference numerals 41 and 43 designate side plates respectively fixed to the right and left portions of a frame 45, the two side plates 41 and 43 and frame 45 forming a reel main body of an electric-drive or motor-drive fishing reel.

Two bearing support members 49, 49 are screwed to internal portions of respective side plates 41 and 43 so as to confront with each other. Each of the bearing support members 49, 49 is of a one-piece construction and includes in the center portion thereof a bearing 47 such as a ball bearing so that a spool shaft 51 is rotatable journaled by the two bearing support members 49 through the two bearings 47. A spool 55 with a fishline 53 wound thereon is mounted on the spool shaft 51 for rotation therewith between the two bearing support members 49.

A spool drive gear train is contained in the side plate 43 so that the spool 55 can be rotationally driven through the spool drive gears train by the rotational operation of a handle 57 mounted at a position eccentric from the center of the side plate 43. In addition, reference numeral 59 designates a handle for drag adjustment.

Figure 3:
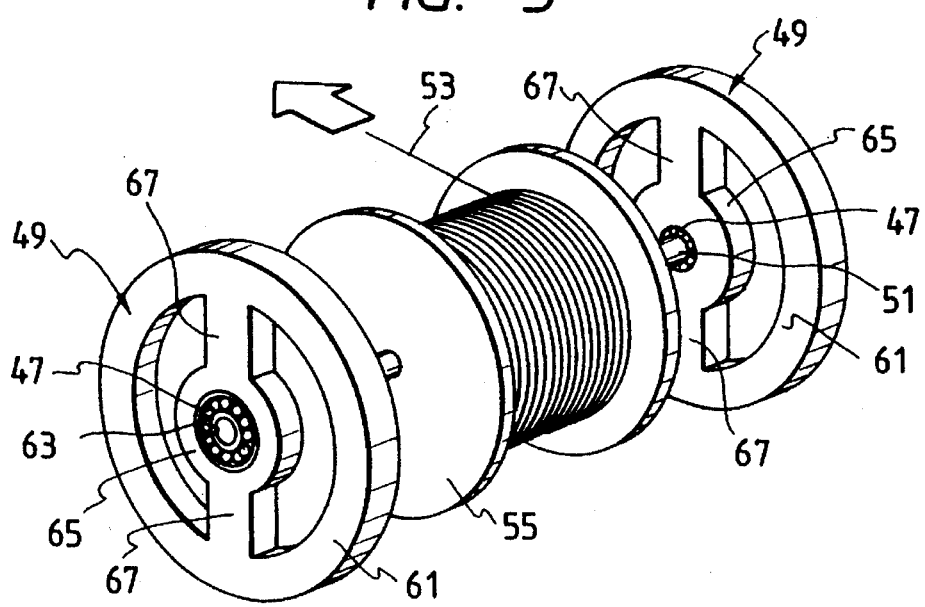
FIG. 3 is an exploded perspective view of a bearing support member and a spool employed in the first embodiment.

As shown in FIG. 3, each of the bearing support members 49 includes a base portion 61 formed as a ring-shaped or annular frame member, a bearing mounting portion 65 having a bearing mounting hole 63 receiving the bearing 47, and two connecting portions 67 for connecting the bearing mounting portion 65 with the base portion 61 and positioning the bearing 47 in place coaxially with the base portion 61. The connecting portions 67 are arranged diametrically symmetrical relative to each other with respect to the base portion 61. Each of the bearing support members 49 is screwed to the side plates 41 and 43 through the base portion 61 in such a manner that the connecting portions 67 extend perpendicularly to the tension direction of the fishline 53 (the tension direction being shown by an arrow in FIG. 3).

Figure 4:
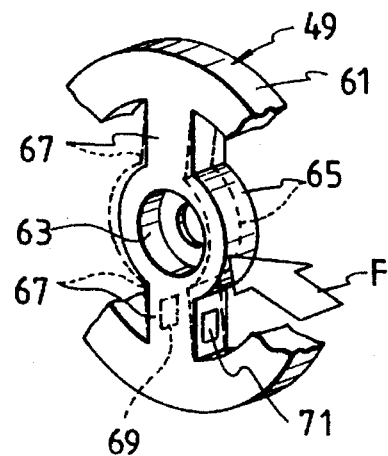
FIG. 4 is a perspective view of the bearing support member, showing the flexing state of the connecting portion of the bearing support member.

The connecting portions 67 provides a flexible structure to the bearing support member 49, and thus, if tension is given to the fishline 53, the connecting portions 67 are then respectively flexed in the tension direction of the fishline 53 according to loading forces F applied to the spool shaft 51 as shown in FIG. 4, thereby causing the bearing mounting portion 65 to shift in the same direction, that is, in the fishline 53 tension direction.

Figure 5:
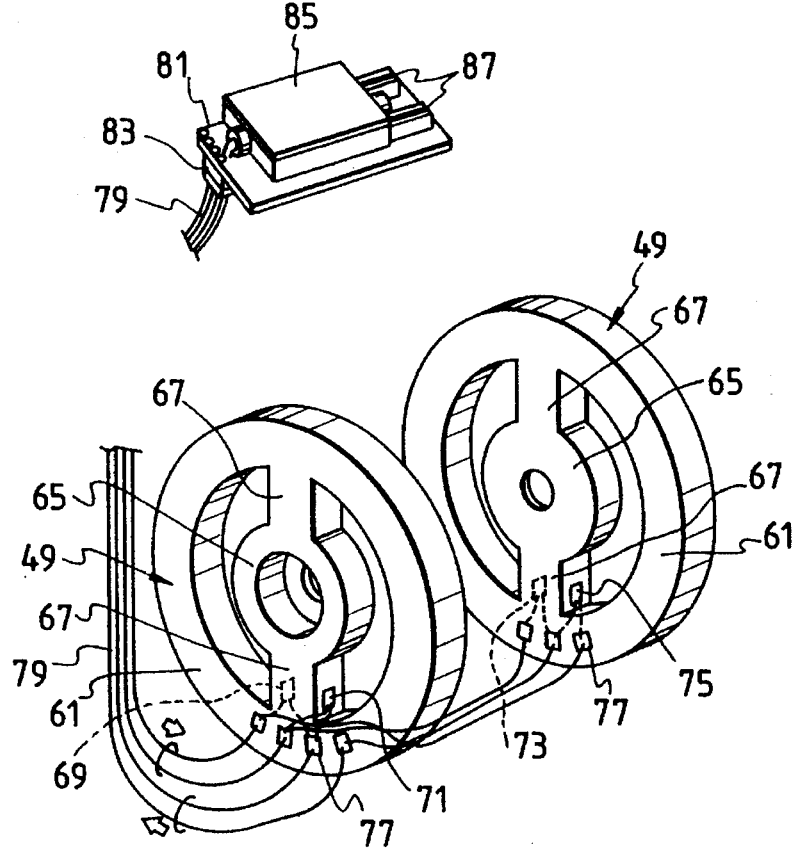
FIG. 5 is an exploded perspective view of the present fishline tension measuring device.
Figure 6:
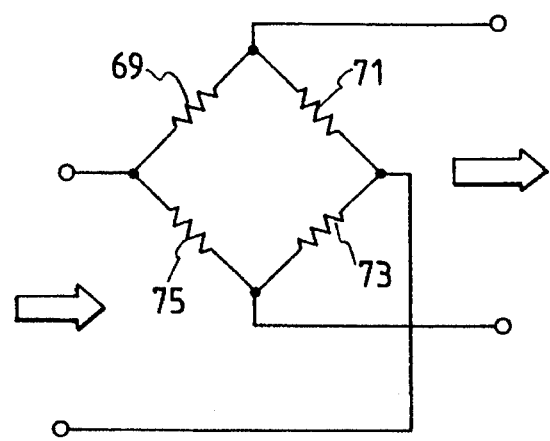
FIG. 6 is a circuit diagram of a bridge circuit used for strain gauges employed in the invention.
Figure 14:
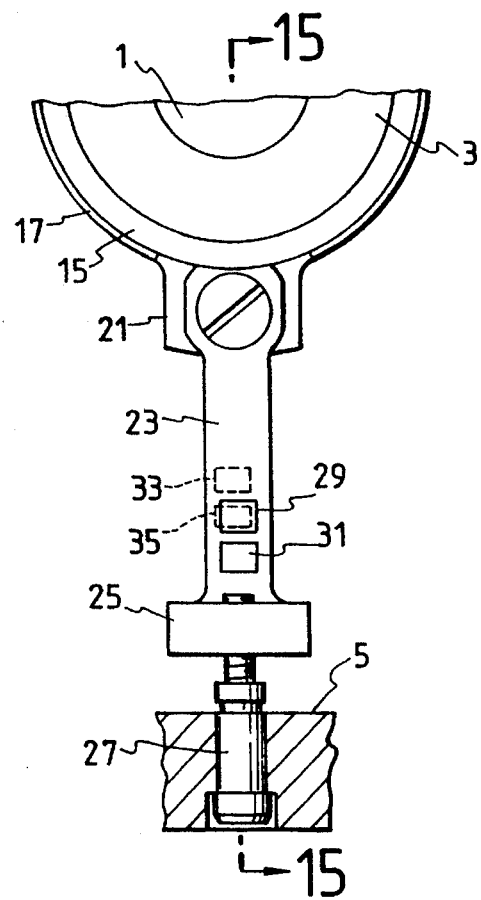
FIG. 14 is a front view of the conventional fishline tension measuring device.
Figure 15:
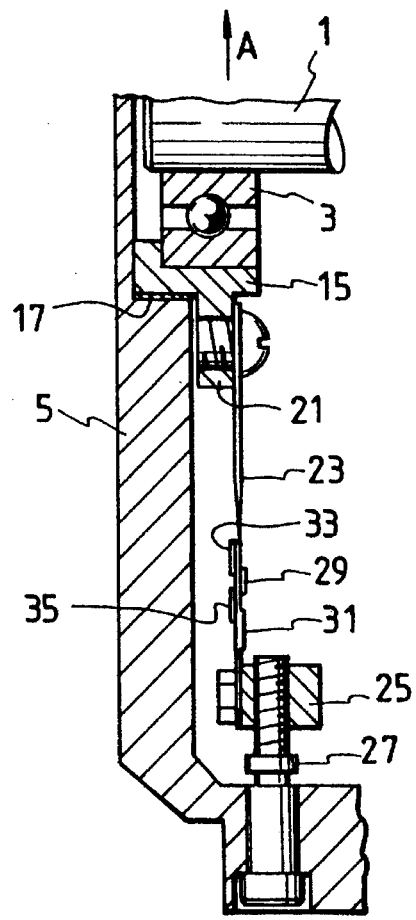
FIG. 15 is a section view taken along the line 15—15 shown in FIG. 14.
Figure 16:
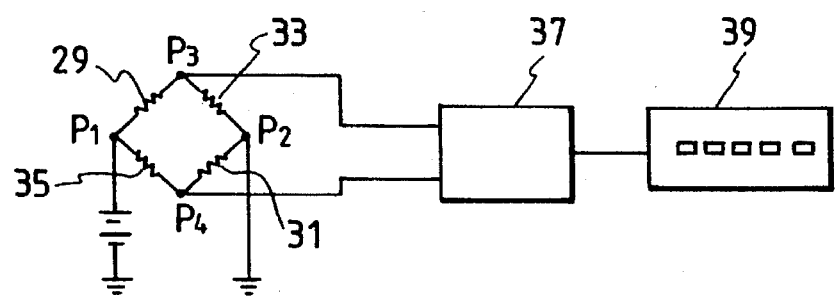
FIG. 16 is a circuit diagram of a strain gauge and an amplifier respectively employed in the conventional fishline tension measuring device.

As shown in FIG. 5, two pairs of strain gauges 69, 71, 73 and 75 are bonded and are then baked to the respective connecting portions 67. That is in the embodiment, the strain gauges 69 and 71 of the one pair are provided on respective surfaces of the lower one of the connecting portions 67 of the bearing support member 49, the surfaces being opposite from each other in the tension direction of the fishline 53. The strain gauges 73 and 75 of the other pair are provided on the other bearing support member 49 in the same manner. The resistance values of the strain gauges 69, 71, 73 and 75 are varied according to the amounts of the flexure or strain of the connecting portions 67 when the connecting portions 67 of the bearing support members 49 are flexed by the load applied to the spool shaft 51 due to the tension of the fishline 53, similarly to the strain gauges 29, 31, 33 and 35 shown in FIG. 14. Thus, the tension of the fishline 53 can be measured by detecting the variation of the resistance values of the strain gauges 69, 71, 73 and 75. The strain gauges 69, 71, 73 and 75 used in this embodiment are connected to one another in a bridge manner as shown in FIG. 6.

In FIG. 5, reference character 77 designates a terminal and 79 stands for wires for the strain gauges 69, 71, 73 and 75. The wires 79 are formed into a flexible film and the flexible film is connected through a connector 83 to a voltage amplifier provided on a circuit substrate 81.

On the circuit substrate 81, beside the voltage amplifier, there are mounted a microcomputer, an A/D converter and the like and, further, on the surface thereof, there are mounted a liquid crystal display device 85 and a keyboard switch 87. The circuit substrate 81 is stored in an IC module 89 having an air-tight structure and mounted in the upper portion of the fishing reel as shown in FIG. 1.

Figure 7:
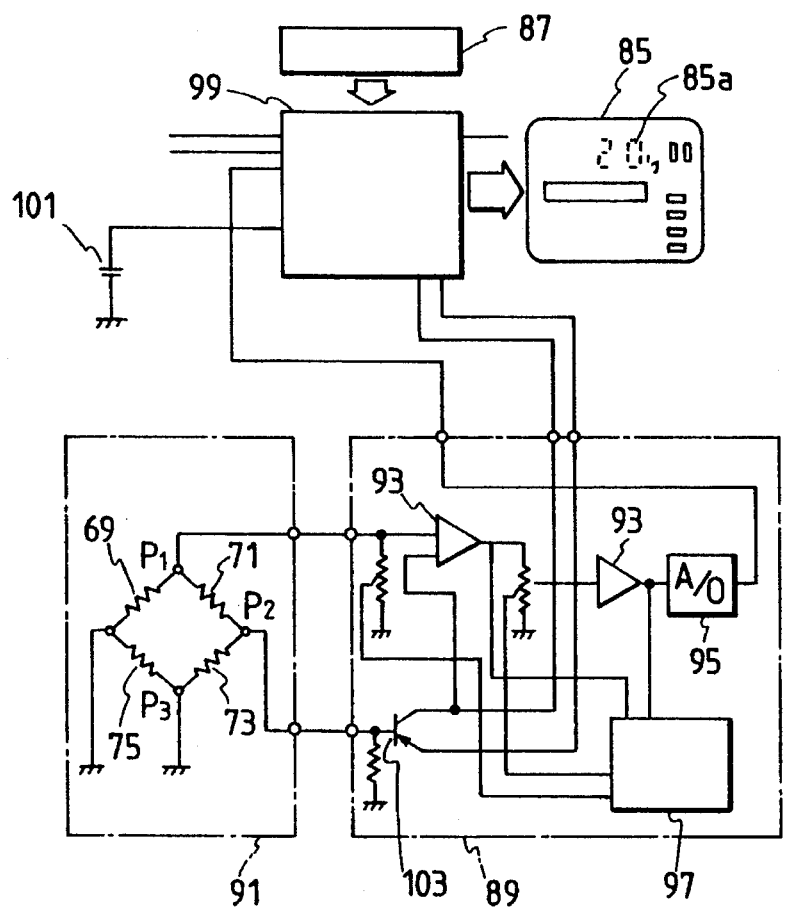
FIG. 7 is a circuit diagram of a strain gauge bridge circuit, and circuits for an amplifier and a microcomputer.

FIG. 7 shows a bridge circuit used for the strain gauges 69, 71, 73 and 75, an amplifier, and a circuit for a microcomputer. In FIG. 7, reference character 91 designates the bridge circuit for the strain gauges 69, 71, 73 and 75; a voltage amplifier 93; an A/D converter 95; a regulator 97 which is used to automatically adjust the zero point and gains of the outputs of the strain gauges 69, 71, 73 and 75; and a microcomputer 99. A connecting point $P_1$ in the bridge circuit 91 is connected to the input of the voltage amplifier 93. The outputs of the strain gauges 69, 71, 73 and 75, after amplified by the voltage amplifier 93, are digitalized by the A/D converter 95 and then input into the microcomputer 99.

Further, in order to extend the life of a battery 101, an ON/OFF switch 103 is connected to a connecting point $P_2$ in the bridge circuit 91. In particular, the ON/OFF switch 103 is operated by a signal from the microcomputer 99 to thereby energize electrically the strain gauges 69, 71, 73 and 75 only for a short time, and the date of the fishline tension are input to the microcomputer 99. The line tension data is displayed on the display portion 85*a* of a liquid crystal display 85.

In addition, in FIG. 2, reference character 105 designates a brake adjustment knob which is used to adjust the braking of the spool 51 in the thrust direction thereof.

Since the fishline tension measuring device according to the above embodiment of the invention is structured in the above-mentioned manner, if a fish is caught by a bait on the fishline 53 played out from the spool 55 and tension is applied to the fishline 53 by a tug given by the fish, then the tension of the fishline 53 is caused to act on the bearing mounting portion 65 of the bearing support member 49 through the spool 55 and spool shaft 51, and consequently, the respective connecting portions 67 are flexed in the tension direction of the fishline 53 according to the loads applied to the spool shaft 51, as shown in FIG. 4.

When flexure is produced in the connecting portions 67 in this manner, then the resistance values of the strain gauges 69, 71, 73 and 75 respectively mounted to the connected portions 67 are caused to vary, thus destroying the balanced condition of the bridge. As a result, a potential difference is produced between the connecting point $P_1$ and its opposing connecting point $P_3$ respectively shown in FIG. 7. The potential difference is proportional to the tension to be applied onto the fishline.

The potential difference produced between the connecting points $P_1$ and $P_3$ is amplified by an amplifier 93, is digitalized by an A/D converter 95, and is input to and processed by a microcomputer 99, and the strain data of the fishline tension obtained as the result of such microcomputer processing are displayed on the display portion 85*a* of a liquid crystal display 85.

Therefore, if an angler or an operator looks at the display of the display portion 85*a*, then the angler is able to judge easily the current condition of the tension of the fishline 53.

Additionally, although not shown, there may be employed a system in which not only the data of the fishline tension is displayed on the display portion 85*a* of the liquid crystal display 85 by use of the microcomputer 99, but also an alarm is operated according to the tension display. With this system, it is possible to notice the tension conditions of the fishline 53 such as the strength limit of the fishline 53 with respect to the tugging of the fish, which in turn makes it possible to perform an easy and quick operation to loosen the drag strength of the fishing reel in order to prevent the fish caught once from escaping off from the fishline 53 due to the line being cut or the like.

Further, it is possible to program various functions such as a fish catch advice notifying that fish is caught, a function to prevent cutting of fish mouth when winding up the fishline together with the fish, a function to change the rotation of a spool drive motor in accordance with the fishline tension data to be input to the microcomputer 99 when the invention is applied to an electric reel for fishing, and other functions.

Furthermore, the fishline tension measuring device according to the present embodiment of the invention, when compared with a conventional fishline tension measuring device shown in FIGS. 13 to 16, can provide the following advantages: that is, the structure thereof can be simplified, and the fishing reel as a whole can be reduced in size and weight. Moreover, the device has a sufficient strength to withstand drop shocks and the like and thus it is possible to measure the fishline tension accurately for a longer period of time.

Figure 8:
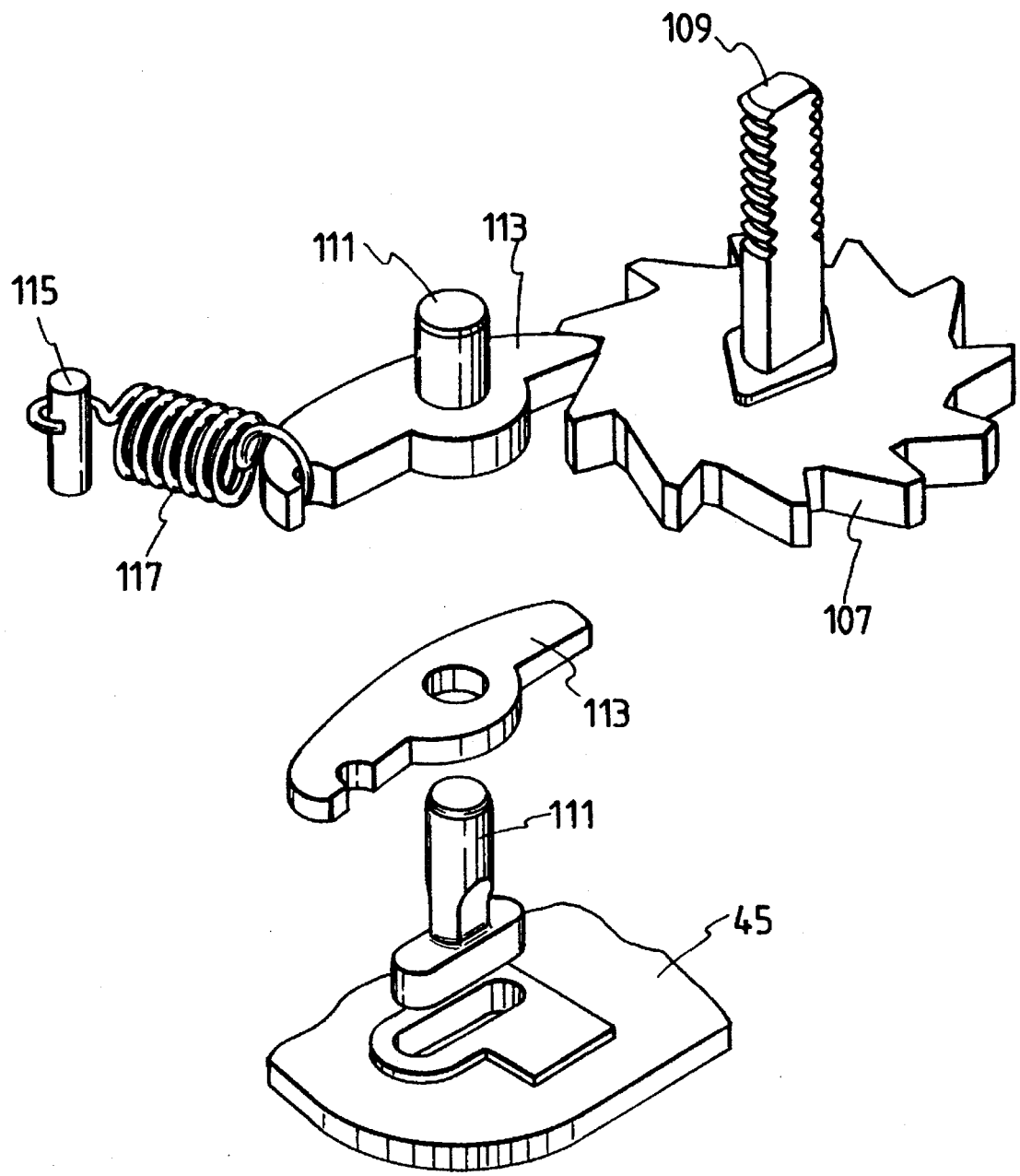
FIG. 8 is an exploded perspective view of a spool stopper device.
Figure 9:
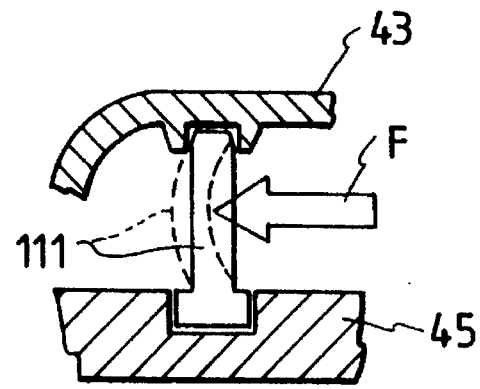
FIG. 9 is a section view of a pin shaft in the flexing state.
Figure 10:
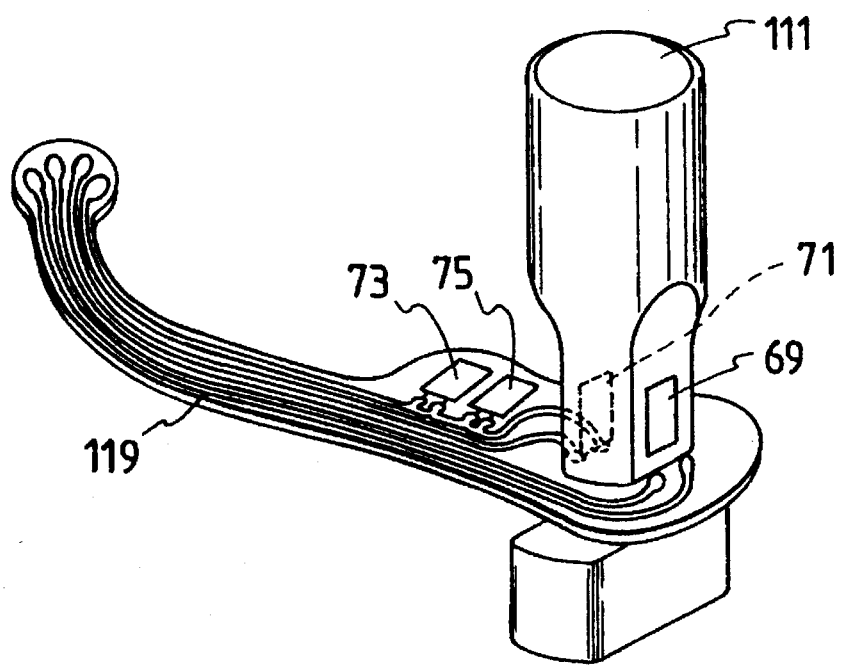
FIG. 10 is a perspective view of a fishline tension measuring device according to a second embodiment of the invention.

FIGS. 8 to 10 are used to describe a second embodiment of a fishline tension measuring device according to the invention. In general, a fishing reel includes a stopper device which is used to prevent the reversed rotation of a spool rotatably journaled on a spool shaft.

The second embodiment makes use of such stopper device so that it can also serve as a fishline tension measuring device. In the second embodiment, the same parts as those used in the first embodiment are designated by the same reference characters.

In particular, FIG. 8 shows a conventional structure employed in the above-mentioned stopper device. In FIG. 8, reference character 107 designates a ratchet mounted on a gear shaft 109, and the ratchet 107 is assembled into a spool drive gear train which is mounted within a side plate 43 so that torque is transmitted to the spool 55 through the ratchet 107. The ratchet 107 engages an engaging claw 113 mounted on a pin shaft 111, the two ends of which, as shown in FIG. 9, are respectively supported by the side plate 43 and frame 45. In this structure, when tension is given to the fishline 53, torque is applied to the gear shaft 109 and thus the ratchet 107 is going to rotate together with the gear shaft 109. However, the engaging claw 113 is engaged with the ratchet 107 to thereby prevent the rotational movement of the ratchet 107 in the reversed direction, i.e. unwinding of the fishline from the spool.

Accordingly, when the engaging claw 113 is engaged with the ratchet 107 to thereby prevent the rotation of the ratchet 107 in this manner, a loading force F is applied to the pin shaft 111 as shown in FIG. 9 so that pin shaft 111 is caused to produce therein such strain as shown by broken lines. The amount of the strain is proportional to the fishline tension. Here, in FIG. 8, reference character 115 designates a boss provided in the frame 45 and, between the boss 115 and engaging claw 113, there is interposed a tension spring 117 which energizes the engaging claw 113.

Thus, according to the second embodiment, as shown in FIG. 10, a pair of strain gauges 69 and 71 are respectively bonded and baked to the two side surfaces of the root portion of the pin shaft 111, the surfaces being opposite from each other in the tension direction of the fishline 53. Another pair of strain gauges 73 and 75 are mounted on a flexible film containing a wiring 119 therein. The strain gauges 69, 71, 73 and 75 are connected to one another in a bridge manner similarly to FIG. 6.

A bridge circuit for the strain gauges 69, 71, 73 and 75, an amplifier, and the circuit of a microcomputer are the same as those shown in FIG. 7 and thus the description thereof is omitted here.

With the second embodiment structured in this manner, when fish is caught by the bait of the fishline 53 played out from the spool 55 causing tension in the fishline 53, then torque is given to the gear shaft 109 and thus the gear shaft 109 is going to rotate together with the gear shaft 109 but the engaging claw 113 is engaged with the ratchet 107 to thereby prevent the rotation of the ratchet 107.

Accordingly, if the engaging claw 113 is engaged with the ratchet 107 to thereby prevent the ratchet 107 from rotating in this manner, then a loading force F is applied to the pin shaft 111. The loading force F causes the pin shaft 111 to produce strain therein as described above, which in turn causes the resistance values of the strain gauges 69, 71, 73 and 75 to destroy the balanced conditions of the bridge. Consequently, there is generated a potential difference between the connecting point $P_1$ and its opposing connecting point $P_3$ respectively shown in FIG. 7.

The potential difference generated between the connecting points $P_1$ and $P_3$ is amplified by a voltage amplifier 93, digitalized by an A/D converter 95, and input to a microcomputer 99. After the potential difference is processed by the microcomputer 99, the results of the processing, that is, the data of the fishline tension are displayed on the display portion 85a of a liquid crystal display 85.

Therefore, according to the second embodiment as well, by looking at the display of the display portion 85a, the angler not only is able to judge easily the current tension of the fishline 53 but also is able to program various functions in accordance with the fishline tension data input to the microcomputer 99. Further, when compared with the conventional fishline tension measuring device shown in the FIGS. 13 to 16, the present embodiment is simpler in structure and makes it possible to reduce the entire size and weight of the fishing reel. Moreover, the second embodiment is able to secure a sufficient strength with respect to drop shocks and the like. That is, similarly to the first embodiment of the invention, the second embodiment can also attain the desired objects.

Figure 11:
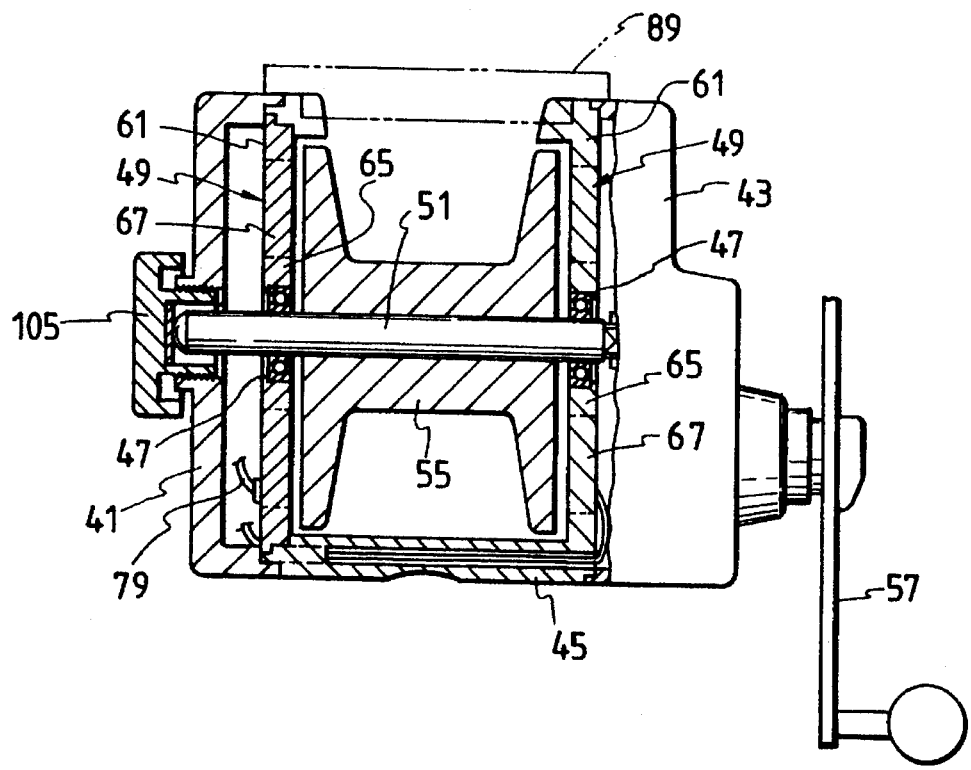
FIG. 11 is a partially cut-away front vie of a fishing reel, showing a modification of the first embodiment.
Figure 12:
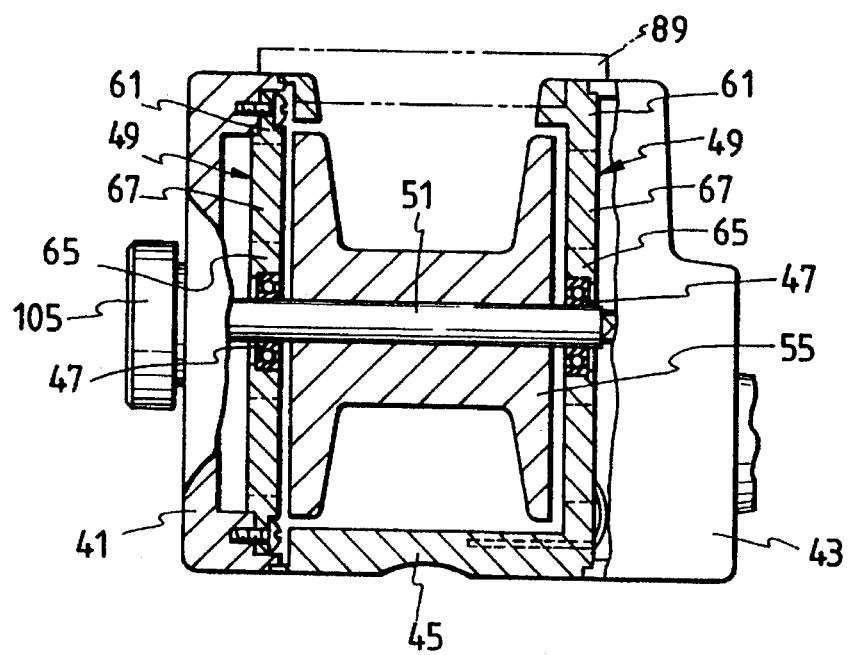
FIG. 12 is a partially cut-away front view of a fishing reel, showing another modification of the first embodiment.
Figure 13:
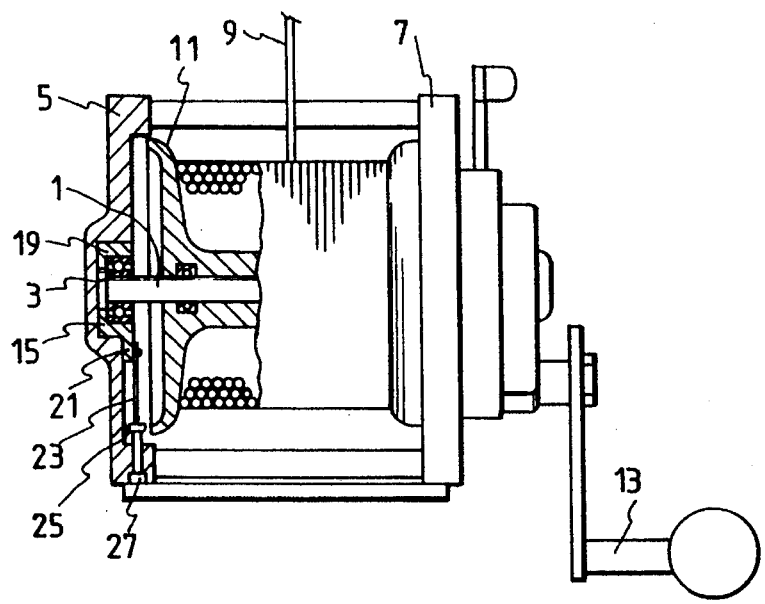
FIG. 13 is a section view of a fishing reel including a conventional fishline tension measuring device.

In the first embodiment, the bearing support members 49 are formed separately from the side plates 41 and 43 and are then screwed to the side plates 41 and 43. However, the invention should not be restricted thereto or thereby. For example, as shown in FIG. 11, one of the bearing support members 49 may be held by and between the side plate 41 and frame 45 and the other bearing support member 49 may be formed integrally with the frame 45. Further, as shown in FIG. 12, one bearing support member 49 may be screwed to the side plate 41 and the other bearing support member 49 may be formed integrally with the frame 45. Furthermore, although not shown, the two bearing support members 49 may be respectively held by and between the side plates 41 and 43 or the right and left bearing support members 49 may be formed integrally with the frame 45, respectively.

Moreover, although in the first embodiment the two end of the spool shaft 51 are supported by the bearing support members 49, only one end of the spool shaft 51 can be supported by the bearing support member 49 to measure the tension of the fishline 53. Yet further, the ring-shaped base portion 61 may be replaced by other kind of base portion such as a rectangular frame. In this case, the base portion is structured in the form of a rectangular frame, a rectangular recessed portion is formed in the frame 45, and a bearing support member having the rectangular base portion is fitted into the rectangular recessed portion, thereby being able to prevent rotation of the bearing support members.

As has been described heretofore, according to the invention, it is possible to simplify the structure of the fishline tension measuring device, reduced the size and weight thereof, and provide a sufficient strength with respect to drop shocks so that the tension of the fishline can be measured accurately for a long period of time.

What is claimed is:

1. A fishline tension measuring device for use in a fishing reel having a main body, said device comprising:
   a bearing support member having a first portion and second portion located radially inward relative to said first portion with respect to a spool shaft, said first portion being fixed to said main body and said second portion supporting a bearing which in turn supports said spool shaft; and
   a strain gauge mounted on a third portion of said bearing support member located radially between said first portion and said second portion with respect to said spool shaft, wherein said third portion extends from said first portion to said second portion radially with respect to said spool shaft and perpendicularly with respect to a direction of a tension caused on a fishline.

2. The device according to claim 1, wherein each of said first and second portions is substantially circular, and said third portion connects said first and second portions so that said first portion is arranged coaxially with respect to said second portion.

3. A fishline tension measuring device for use in a fishing reel having a main body supporting a spool onto which a fishline is wound, said device comprising:
   a plurality of bearing support members each supporting a bearing with respect to said main body, said bearing support members and said bearings are located at both axial ends of the spool, said bearings rotatably support the spool;
   at least one strain gauge mounted on an integral portion of each said plurality of bearing support members so as to detect an amount of strain caused on said plurality of bearing support members due to tension applied to the fishline; and
   a microcomputer for receiving and processing said detected amount of strain from each said strain gauge to determine total strain on said plurality of bearing support members.

4. The device according to claim 3, further comprising:
   means for converting said total strain into data indicative of said tension applied to said fishline and visually indicating said data on a display.

5. The device according to claim 3, wherein each of said plurality of bearing support members includes a first portion adapted to be fixed to the main body, and a second portion for supporting one of said bearings, wherein said integral portion on which said at least one strain gauge is mounted integrally connects said first and second portions such that said first portion, said second portion and said integral portion form a one-piece body.

6. The device according to claim 3, wherein said bearing support member is mounted onto the main body with screw means.

7. The device according to claim 3, wherein said bearing support member is formed as an integral part of the main body.

* * * * *